US012291602B2

(12) United States Patent
Anderson

(10) Patent No.: US 12,291,602 B2
(45) Date of Patent: May 6, 2025

(54) POLYMERIZABLE COMPOSITIONS INCLUDING A PHTHALONITRILE RESIN AND A POLYOXOMETALATE, ARTICLES, AND METHODS

(71) Applicant: 3M INNOVATIVE PROPERTIES COMPANY, St. Paul, MN (US)

(72) Inventor: Benjamin J. Anderson, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 503 days.

(21) Appl. No.: 17/788,328

(22) PCT Filed: Feb. 11, 2021

(86) PCT No.: PCT/IB2021/051133
§ 371 (c)(1),
(2) Date: Jun. 23, 2022

(87) PCT Pub. No.: WO2021/165797
PCT Pub. Date: Aug. 26, 2021

(65) Prior Publication Data
US 2023/0063744 A1 Mar. 2, 2023

Related U.S. Application Data

(60) Provisional application No. 62/979,518, filed on Feb. 21, 2020.

(51) Int. Cl.
*C08G 73/06* (2006.01)
(52) U.S. Cl.
CPC .................. *C08G 73/0672* (2013.01)
(58) Field of Classification Search
CPC .................................. C08G 73/0672
USPC ...................................... 528/422
See application file for complete search history.

(56) References Cited

U.S. PATENT DOCUMENTS

| | | |
|---|---|---|
| 3,496,250 A | 2/1970 | Czerwinski |
| 4,223,123 A | 9/1980 | Keller et al. |
| 4,304,896 A | 12/1981 | Keller et al. |
| 4,408,035 A | 10/1983 | Keller |
| 5,003,039 A | 3/1991 | Keller |
| 5,237,045 A | 8/1993 | Burchill et al. |
| 5,247,060 A | 9/1993 | Keller |
| 8,394,977 B2 | 3/2013 | Tiefenbruck et al. |
| 8,853,350 B1 | 10/2014 | Anderson |

FOREIGN PATENT DOCUMENTS

| | | |
|---|---|---|
| WO | 2017/105890 A1 | 6/2017 |
| WO | 2017/172515 A1 | 10/2017 |
| WO | 2017/173040 A1 | 10/2017 |
| WO | 2017/173195 A1 | 10/2017 |
| WO | 2018175025 A1 | 9/2018 |
| WO | 2020/109902 A1 | 6/2020 |

OTHER PUBLICATIONS

Augustine, "Polyphthalonitrile resins and their high-end applications", Thermosets (Second Edition)—Structure, Properties, and Applications, 2018, pp. 577-619.
Burchill, "On the formation and properties of a high-temperature resin from a bisphthalonitrile", Journal of Polymer Science Part A: Polymer Chemistry, 1994, vol. 32, No. 1, pp. 1-8.
Dominguez, "Properties of phthalonitrile monomer blends and thermosetting phthalonitrile copolymers", Polymer, 2007, vol. 48, No. 1, pp. 91-97.
International Search Report for PCT International Application No. PCT/IB2021/051133, mailed on May 20, 2021, 4 pages.
Long, "Polyoxometalates: Building Blocks for Functional Nanoscale Systems", Angewandte Chemie International Edition, Mar. 2010, vol. 49, No. 10, pp. 1736-1758, XP055050174.
McKeown, "The Synthesis of Symmetrical Phthalocyanines", The Porphyrin Handbook, 61-124 (2003).
Sharman, "Synthesis of Phthalocyanine Precursors", The Porphyrin Handbook, 1-60, (2003).
Snow, "Molecular association and monolayer formation of soluble phthalocyanine compounds", Journal of the American Chemical Society, Aug. 1984, vol. 106, No. 17, pp. 4706-4711.
Snow, "Syntheses and characterization of heteroatom-bridged metal-free phthalocyanine network polymers and model compounds", Macromolecules, Aug. 1984, vol. 17, No. 8, pp. 1614-1624.

*Primary Examiner* — David T Karst
(74) *Attorney, Agent, or Firm* — Adrian L. Pishko

(57) ABSTRACT

The present disclosure provides a polymerizable composition. The polymerizable composition includes a phthalonitrile resin, a curative, and a polyoxometalate of Formula I: $H_n[XM_{12}O_{40}]$ (I). In Formula (I), M is W or Mo, n is 1 to 6, and X is a heteroatom selected from P, Si, S, Ge, As, Te, or Se. The present disclosure also provides an article. The article includes a polymerization product of the polymerizable composition. Additionally, a method is provided. The method includes mixing a polyoxometalate of Formula I with at least one of a curative or phthalonitrile resin and mixing at least a portion of the curative with at least a portion of the phthalonitrile, thereby forming a polymerizable composition. The method further comprises subjecting the polymerizable composition to a temperature of 180° C. to 250° C., to form an at least partially polymerized article and subjecting the at least partially polymerized article to a temperature of 300° C. to 350° C. to complete polymerization of the article.

18 Claims, No Drawings

POLYMERIZABLE COMPOSITIONS INCLUDING A PHTHALONITRILE RESIN AND A POLYOXOMETALATE, ARTICLES, AND METHODS

FIELD

The present disclosure generally relates to polymerizable compositions including phthalonitrile resins.

BACKGROUND

Phthalonitriles are dinitrile ortho substituted aromatic rings. Phthalonitriles and their ring substituted variants are important precursors in the development of chemical dyes, pigments, and agrochemicals. Of more recent interest, phthalonitrile (PN) resins are being developed for use in emerging fields such as electronic materials, energy storage, and structural materials. Phthalonitriles will oligomerize and cyclize under various documented reaction conditions. (McKeown, N. B., *The Synthesis of Symmetrical Phthalocyanines*, in *The Porphyrin Handbook*, K. M. Kadish, K. M. Smith, and R. Guilard, Editors. 2003, Academic Press: Amsterdam. p. 61-124.)

SUMMARY

Polymerizable compositions containing phthalonitrile resins and polyoxometalate compounds are described. The polyoxometalates tend to increase the processing time of the polymerizable compositions by delaying initiation of the phthalonitrile polymerization to a higher temperature and shorten the post cure time due to an ability of the network to achieve higher extents of polymerization earlier in the polymerization reaction exemplified by a greater enthalpy of reaction.

In a first aspect, a polymerizable composition is provided. The polymerizable composition comprises a phthalonitrile resin, a curative, and a polyoxometalate of Formula I: $H_n[XM_{12}O_{40}]$ (I). In Formula I, M is W or Mo, n is 1 to 6, and X is a heteroatom selected from P, Si, S, Ge, As, Te, or Se.

In a second aspect, an article is provided. The article comprises a polymerization product of the polymerizable composition according to the first aspect.

In a third aspect, a method is provided. The method comprises mixing a polyoxometalate with at least one of a curative or a phthalonitrile resin and mixing at least a portion of the curative with at least a portion of the phthalonitrile, thereby forming a polymerizable composition comprising the phthalonitrile resin, the curative, and the polyoxometalate of Formula I above. The method further comprises subjecting the polymerizable composition to a temperature of 180° C. to 250° C., to form an at least partially polymerized article and subjecting the at least partially polymerized article to a temperature of 300° C. to 350° C. to complete polymerization of the article.

Temperature resistant polymer networks are critical for an increasing number of market applications. As the environmental temperature of an application increases, the number of available materials able to meet requirements shrinks rapidly. The present polymerizable compositions are useful for applications in which a temperature resistant polymer is beneficial.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example "A and/or B" means only A, only B, or both A and B.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

As used herein, the term "phthalonitrile" is inclusive of compounds having the characteristic benzene derivative having two adjacent nitrile groups. In the illustrated phthalonitrile group, R is for instance and without limitation, ether, thioether, aryl, alkyl, halogen, amine, ester, or amide, heteroalkyl, or (hetero)hydrocarbyl.

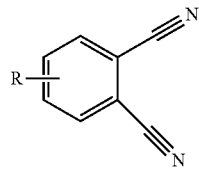

As used herein, "bisphenol M diphthalonitrile ether" refers to bis(3,4-dicyanophenyl) ether of bisphenol M.

As used herein, "bisphenol T diphthalonitrile ether" refers to bis(3,4-dicyanophenyl) ether of bisphenol T.

As used herein, "resorcinol diphthalonitrile ether" refers to bis(3,4-dicyanophenyl) ether of resorcinol.

As used herein, a "particle" has an aspect ratio of less than 50:1 of the largest dimension to the smallest dimension, and excludes fibers. As used herein, "nanoparticle" refers to a particle having a D90 particle diameter below 1 micrometer (e.g., "submicron"). As used herein, "particle diameter" refers to the largest dimension of a particle. A suitable method to determine the particle diameter of a nanometer scale particle includes transmission electron microscopy (TEM). As used herein, "microparticle" refers to a particle having a D90 particle diameter below 1 millimeter. A suitable method to determine the particle diameter of a micrometer scale particle includes dynamic light scattering. As used herein, "D90" refers to 90 percent of a population of particles having a particle diameter below the particular particle diameter value.

As used herein, "nanofiller" refers to an additive included in a polymerizable composition that has at least two dimensions (of height, width, and length) that are less than 1 micrometer. As used herein, "microfiller" refers to an additive included in a polymerizable composition that has at least two dimensions (of height, width, and length) that are less than 1 millimeter.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, Si, P, and N, and both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, the term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, the term "aralkylene" refers to a divalent group of formula —R—$Ar^a$— where R is an alkylene and $Ar^a$ is an arylene (i.e., an alkylene is bonded to an arylene).

As used herein, the term "alkoxy" refers to a monovalent group of formula —OR, where R is an alkyl group.

As used herein, the term "carbonyl" refers to a divalent group of formula —(CO)—, where the carbon atom is attached to the oxygen atom with a double bond.

As used herein, the term "alkoxycarbonyl" refers to a monovalent group of formula
—C(=O)OR, where R is an alkyl group.

As used herein, the term "alkylcarbonyl" refers to a monovalent group of formula —(CO)R, where the carbon atom is attached to the oxygen atom with a double bond and where R is an alkyl group.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero) hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "thienyl" refers to a monovalent group having the formula

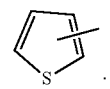

As used herein, the term "hydroxyl" refers to a monovalent group of formula —OH.

As used herein, the term "thiol" refers to a monovalent group of formula —SH.

As used herein, the term "amino" refers to a monovalent group of formula —$NR_2$, where each R is independently H or an alkyl.

As used herein, the term "carboxylic acid" refers to a monovalent group of formula
—C(=O)OH.

As used herein, the term "halogen" refers to an atom selected from fluorine, chlorine, bromine, or iodine.

As used herein, the term "polymerized product" refers to a polymerized result of a polymerization reaction of a polymerizable composition.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

Various exemplary embodiments of the disclosure will now be described. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

The present disclosure is generally directed to phthalonitrile resins containing a polyoxometalate, articles, and methods.

In a first aspect, a polymerizable composition is provided. The polymerizable composition comprises:
a) a phthalonitrile resin;
b) a polyoxometalate of Formula I: $H_n[XM_{12}O_{40}]$ (I), wherein M is W or Mo, n is 1 to 6, and X is a heteroatom selected from P, Si, S, Ge, As, Te, or Se; and
c) a curative.

In a second aspect, an article is provided comprising a polymerization product of any of the polymerizable compositions described herein.

Phthalonitrile resins are a class of network forming resins that employ a least one multifunctional phthalonitrile resin component that when polymerized form a crosslinked polymer network. These polymer networks are characterized by excellent thermal stability and degradation resistance, but commercialization of phthalonitrile resin technology and use is hindered by poor processing properties, high cost, and high temperature autoclave cures. Phthalonitrile resins have high melt temperatures due to the rigid structure of many phthalonitrile monomers which incorporate a large percentage of aromatic structures to maintain the thermal performance of the phthalonitrile polymerized network. The phthalonitrile moiety is also rigid and planar and has a tendency to crystallize. These molecular structure attributes contribute to the high melt temperature of multifunctional PN resins. The high cost of the resin is driven by resin synthesis which utilizes higher cost starting materials similar to anhydride and imide resins and multistep synthesis routes. (Sharman, W. M. and J. E. Van Lier, *Synthesis of Phthalocyanine Precursors*, in *The Porphyrin Handbook*, K. M. Kadish, K. M. Smith, and R. Guilard, Editors. 2003, Academic Press: Amsterdam, p. 1-60.) A high glass transition temperature of the polymerized resin imparts excellent thermal stability at high service temperatures, but also contributes to the need for long time (>24 hours) high temperature (>325° C.) multistep autoclave cures under inert atmosphere to drive conversion at temperatures that also cause network degradation.

Polyoxometalates (POMs) are a class of multinuclear oxometalates formed from 4B to 6B transition metals. The size of a POM increases with the number of oxometalate centers. Phosphotungstate (PTA) and silicotungstate (STA) have the Keggin structure and are composed of twelve tungsten oxometalate centers and a phosphate group or silicate at the core, respectively. The Keggin structure has a chemical formula of $[H_nXM_{12}O_{40}]$. The metal, M is commonly V, Nb, Mo, or W, and X is a 4A-5A element commonly P or Si or S. The surface possesses either 2 to 3 or 4 hydroxyl groups depending on the choice of the central atom whether sulfur, phosphorous, or silicon, respectively. The POMs formed from 6B metals such at W, and Mo are acidic. The POMs formed from 5B metals such as Nb are basic. Many different POM structures have been discovered with diverse properties. (Long, D.-L., R. Tsunashima, and L. Cronin, *Polyoxometalates: Building Blocks for Functional Nanoscale Systems*. Angewandte Chemie International Edition, 2010. 49: p. 1736-1758.) The 6B metal POMs of W and Mo are the most widely known and easily accessible: particularly, the Lindquist $[H_2M_6O_{18}]$ homonuclear POMs, and Keggin $[H_nXM_{12}O_{40}]$ and Dawson $[H_nX_2M_{18}O_{62}]$ heteronuclear structured POMs.

It has unexpectedly been discovered that at least certain Keggin POMs provide advantageous effects when included in phthalonitrile polymerizable compositions. For instance, in some embodiments, in Formula I described above, M is W. In select embodiments, the polyoxometalate is $H_3[P(W_3O_{10})_4]$ or $H_4[Si(W_3O_{10})_4]$, preferably $H_3[P(W_3O_{10})_4]$. In some embodiments, in Formula I, M is Mo, and preferably the POM is $H_3[P(Mo_3O_{10})_4]$.

Phthalonitriles are an ideal precursor resin for bulk polymerization. Phthalonitriles undergo an addition polymerization reaction when promoted by a curative. Primary amines such as aniline and phenols act as phthalonitrile curatives and promote the polymerization of phthalonitrile moieties into phthalocyanine rings and other structures. (Snow, A. W., J. R. Griffith, and N. P. Marullo, *Syntheses and characterization of heteroatom-bridged metal-free phthalocyanine network polymers and model compounds*. Macromolecules, 1984, 17(8): p. 1614-1624.) The mechanism of polymerization and the resulting structure has been investigated by many. (Derradji, M., J. Wang, and W. Liu, *Phthalonitrile Resins and Composites*. Plastics Design Library, ed. S. Ebnesajjad. 2018, Cambridge, MA: Matthew Deans.) The phthalocyanines can exist in one of two forms: the metal free ($PcH_2$) or the metal containing (PcM) phthalocyanine. $PcH_2$ may be formed from the addition of a base, an alcohol and heat, or a suitable reducing agent. These conditions may be satisfied through the addition of an amine base with a primary alcohol (e.g., $C_1$-$C_5$ alcohols). PcM may be formed by the addition of metals, organometals, or metal salts and heat. The base catalyzes the formation of a $PcH_2$ and the oxidation of an alcohol to an aldehyde. Oxidation of the alcohol supplies the two electrons and two protons formally needed for $PcH_2$ formation. (McKeown, N. B., *The Synthesis of Symmetrical Phthalocyanines*, in *The Porphyrin Handbook*, K. M. Kadish, K. M. Smith, and R. Guilard, Editors. 2003, Academic Press: Amsterdam. p. 61-124.) The downside of many base alcohol systems, reducing agent, and organometal and metal salts for bulk polymerization reactions is often the evolution of volatile species such as the aldehyde, the reducing agent, or the compounds complexed to the metal.

In the absence of a primary alcohol able to undergo oxidation to an aldehyde, Keller proposed that amines act as phthalonitrile curatives and give rise to the polymeric linked structure shown in Scheme 1 below. (U.S. Pat. No. 4,408,035 to Keller and U.S. Pat. No. 4,223,123 to Keller et al.) The initial N-substituted-3-iminoisoindolenine formed from the reaction of a phthalonitrile with an amine acts as a propagating end and reacts with further phthalonitriles to form a poly(isoindolenine) linked polymer network. The lack of an alcohol able to undergo oxidation to an aldehyde is believed to hinder the formation of a PcH$_2$ phthalocyanine ring. Aromatic amines such as aniline and phenols have good reactivity with phthalonitriles and are able to promote polymerization to a networked polymer. Higher molecular weight, lower volatility, aniline and phenol functional curatives are desired to avoid volatilization of the curative during polymerization. In some embodiments, a suitable curative comprises at least one of an aniline functionality or a phenol functionality. The curative optionally comprises an aniline functional phthalonitrile. In select embodiments, the curative comprises a dianiline functionality or a phenol functionality (e.g., a phenol functional phthalonitrile). Some suitable curatives include at least one of 4-(4-aminophenoxy)phthalonitrile, 1,3-bis(3-aminophenoxy)benzene, 4-(3-aminophenoxy)phthalonitrile, or 9,9-bis(4-amino-3-chlorophenyl)fluorene. In an embodiment, the curative comprises 4-(4-aminophenoxy)phthalonitrile.

Dianiline- and bisphenol-based curatives are of value due to a higher aniline and phenol functionality per weight of the curative. Example dianiline based curatives that will promote phthalonitrile polymerization include 4,4'-(1,3-phenylenedioxy)dianiline, 4,4'-(1,4-phenylenedioxy)dianiline, bis[4-(4-aminophenoxy)phenyl]sulfone, 4,4'-(4,4'-isopropylidenediphenyl-1,1'-diyldioxy)dianiline, 4,4'-(1,3-phenylenediisopropylidene)dianiline, 4,4'-(1,4-phenylenediisopropylidene)dianiline, 4,4'-(1,1'-biphenyl-4,4'-diyldioxy)dianiline, 4,4'-methylenedianiline, 4,4'-methylene-bis(2-methylaniline), 3,3'-methylenedianiline, 3,4'-methylenedianiline, 4,4'-oxydianiline, 4,4'-(isopropylidene)dianiline, 4,4'-(hexafluoroisopropylidene)dianiline, 4,4'-(hexafluoroisopropylidene)bis(p-phenyleneoxy)dianiline, 4,4'-diaminobenzophenone.

Combinations of various curatives can be used if desired. The curative is typically present in an amount of at least 1 wt. % or more of the polymerizable composition, 2 wt. %, 5 wt. %, 10 wt. %, 15 wt. %, or even 20 wt. % or more of the polymerizable composition; and up to 40 wt. % of the polymerizable composition, 35 wt. %, 30 wt. %, or even up to 25 wt. % of the polymerizable composition; such as between 0 and 40 wt. % of the polymerizable composition. The primary amine promoted phthalonitrile cure reaction proceeds at an appreciable rate between temperatures of 200° C. to 250° C. Amine cured phthalonitrile polymerized networks have demonstrated excellent thermal stability imparted by a high glass transition temperature, good thermal and thermoxidative degradation resistance, plus are inherently non-flammable, and have low moisture uptake.

Scheme 1: Phthalonitrile resin system (phthalonitrile resin containing at least one multifunctional phthalonitrile resin + an aromatic amine)

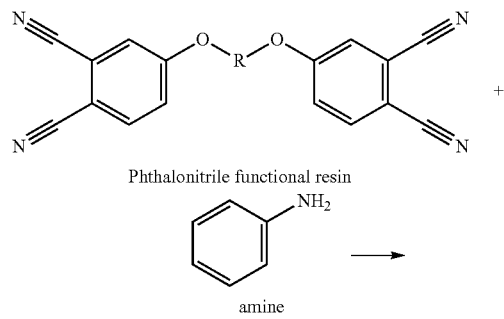

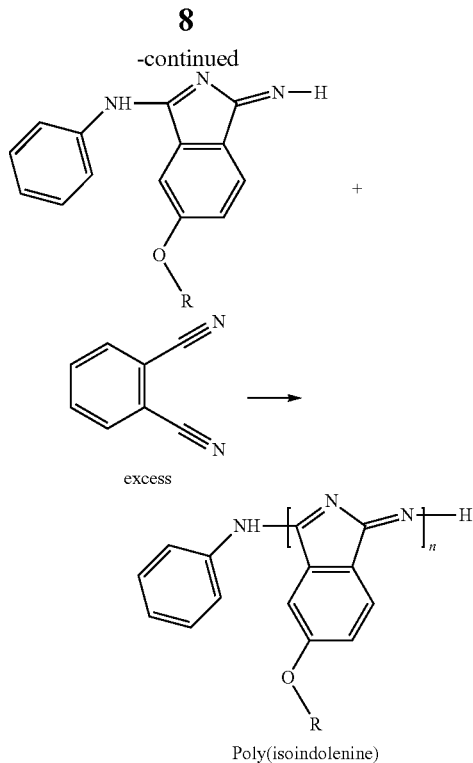

Poly(isoindolenine)

Burchill later proposed a different method of polymerization of phthalonitriles when initiated by an amine or an amine salt. (Burchill, P. J., *On the formation and properties of a high-temperature resin from a bisphthalonitrile*. Journal of Polymer Science Part A: Polymer Chemistry, 1994. 32(1): p. 1-8) Burchill proposed that the amine reacts with one of the nitrile groups to form an amidine (Scheme 2) which acts as the propagating species and is more prevalent than the N-substituted-3-iminoisoindolenine proposed by Keller. The amidine reacts with two other phthalonitriles to produce a triazine ring and liberate the amine to initiate a new reaction sequence. This mechanism gives rise to a triazine crosslinked polymer network rather than a polyisoindolenine or phthalocyanine linked network. IR studies of phthalonitrile polymerized networks show the presence of both triazine and phthalocyanine structures. (Snow, A. W. and N. L. Jarvis, *Molecular association and monolayer formation of soluble phthalocyanine compounds*. Journal of the American Chemical Society, 1984. 106(17): p. 4706-4711.) Burchill proposed that the phthalocyanine is a minor crosslink structure compared to the triazine and is promoted by impurities in the phthalonitrile resin. Burchill's triazine crosslink mechanism is supported by Keller's work of the cure of phthalonitrile resins by acids which resulted in brown colored polymers with polytriazine as the main structure. Keller states that this observation indicates that different polymerization products result from phthalonitrile resins cured with acid and amine. (U.S. Pat. No. 5,247,060 to Keller.) Burchill found the same to be true for amine acid salts. (Burchill, P. J., *On the formation and properties of a high-temperature resin from a bisphthalonitrile*. Journal of Polymer Science Part A: Polymer Chemistry, 1994. 32(1): p. 1-8.; and U.S. Pat. No. 5,237,045 to Burchill et al.)

The polymerization of a phthalonitrile resin system (e.g., a phthalonitrile resin containing at least one multifunctional phthalonitrile resin and at least one curative (e.g., amine or phenol), whether by propagation of an amidine or an isoindolenine) is understood to occur in two stages once the temperature exceeds a temperature sufficient to promote polymerization, typically >180° C. (e.g., Scheme 2 below). In the first stage the aniline or phenol curative acts as a nucleophile and attacks a phthalonitrile moiety to form the propagation species, which reacts with other phthalonitrile to form triazine crosslinks or poly(isoindolenine) oligomers and phthalocyanine. (U.S. Pat. No. 4,408,035 to Keller and Dominguez, D. D. and T. M. Keller, *Properties of phthalonitrile monomer blends and thermosetting phthalonitrile copolymers.* Polymer, 2007. 48(1): p. 91-97.) The amidine in the case of an amine curative may react with two other phthalonitrile moieties and trimerize to form triazine crosslinks and liberate the amine. Snow and Jarvis showed that small amounts of water in the resin system favors triazine formation rather than phthalocyanine when reacted with an amine or phenol. In the second stage of the cure reaction the poly(isoindolenine) oligomers are heated to thermally convert to phthalocyanine tetrameric structures. The second stage employs long time high temperature (e.g., >350° C.) multistep autoclave cure schedules to drive phthalocyanine formation or further triazine formation, depending on which polymerization mechanism is favored. If triazine is formed during the first stage of the reaction the triazine will not form phthalocyanine upon heat treatment. These two types of crosslink structures were explained by Snow and Jarvis. It is preferred to limit the amount of triazine formed and maximize the formation of phthalocyanine. Phthalocyanine crosslinks are more thermally stable than triazine and should elevate the glass transition temperature of a polymer network to a greater extent than triazine. Besides limiting the presence of moisture in the resin system, no curative technology has shown an ability to favor one cross link structure, either triazine or pthalocyanine, over the another.

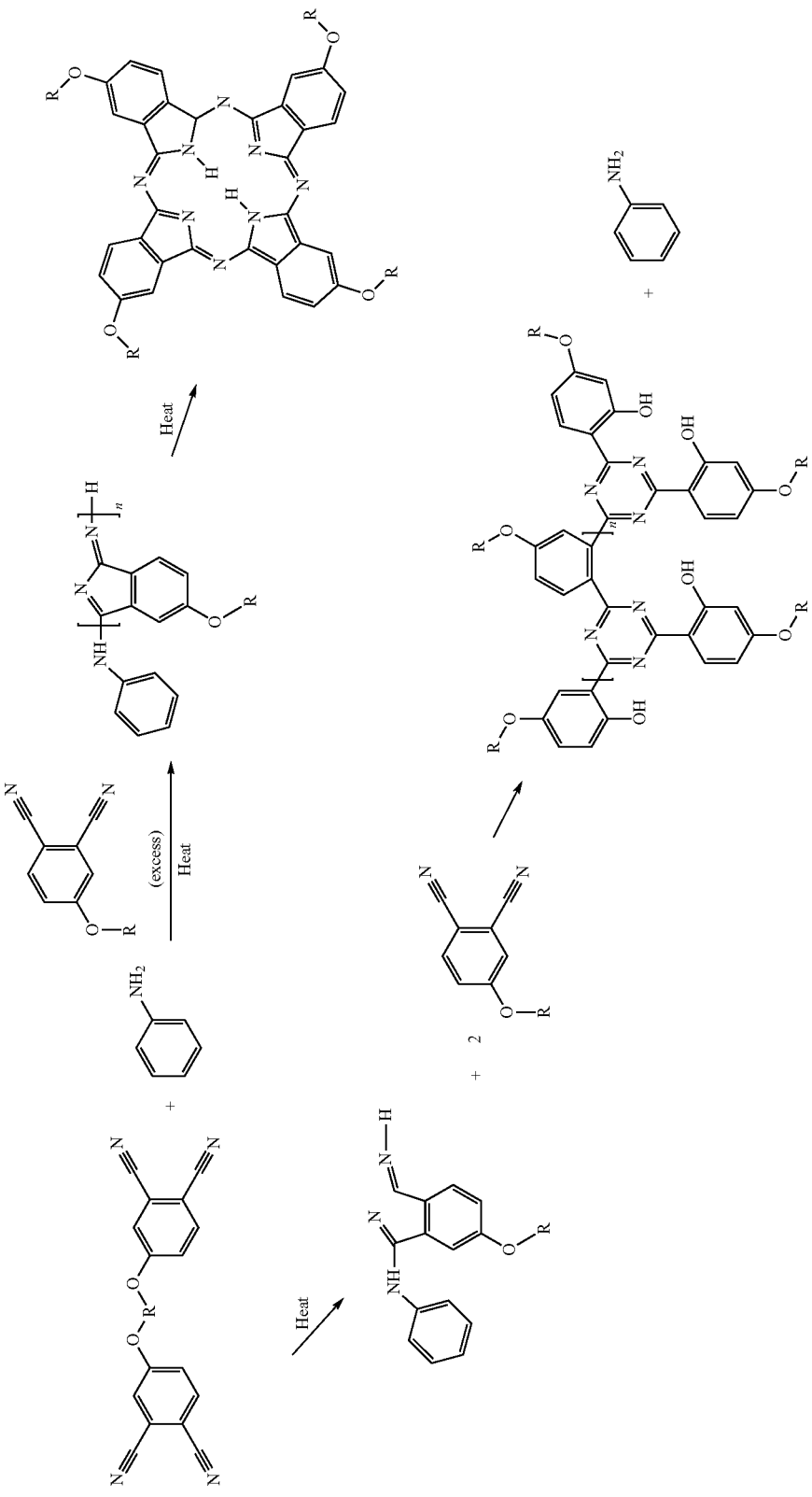

As noted above, current phthalonitrile resin system technologies require lengthy high temperature multistep post cures, often to temperatures >350° C. for an extended period of time. These lengthy post cures are meant to drive further polymerization of the phthalonitrile. The times and temperatures required to drive polymerization to a high degree of conversion are undesirably long. This is a complex problem and is linked to the slow formation of phthalocyanine and to the low molecular mobility of the network as a result of a high crosslink density and the rigid polymer backbone structure of the network that originates from the highly aromatic phthalonitrile monomer resins. Lower post cure temperatures and times are preferred to prevent thermal degradation of the network during post cure. Temperatures over 350° C. are undesirable because they induce premature degradation of the polymer network. Post cure times of greater than 24 hours are often employed to strengthen the network and drive formation of phthalocyanine and phthalonitrile conversion. The long-time post cures at extreme temperatures are problematic for manufacturing because of the energy and time require to make a single cured article.

It has been discovered that the addition of at least certain POMs to a phthalonitrile resin system (e.g., phthalonitrile resin and curative) can be beneficial to providing a more optimal degree of polymerization than if a curative such as an aniline or phenol functional curative were added alone. Surprising beneficial processing and cure properties of a phthalonitrile resin system with dispersed POM are described in the present disclosure (e.g., Scheme 3 below). The enhanced mechanical properties of a phthalonitrile polymerized network containing a POM are also described.

Scheme 3: Phthalonitrile POM resin system
(phthalonitrile resin containing at least one
multifunctional phthalonitrile resin + curative + polyoxomethalate)

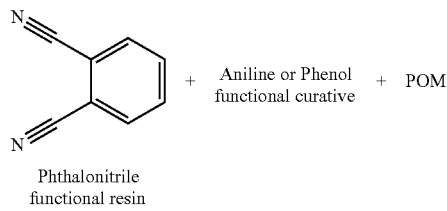

Phthalonitrile functional resin + Aniline or Phenol functional curative + POM

In a third aspect, a method of making an article is provided. The method comprises:
a) mixing a polyoxometalate with at least one of a curative or phthalonitrile resin, wherein the polyoxometalate is of Formula I: $H_n[XM_{12}O_{40}]$ (I), wherein M is W or Mo, n is 1 to 6, and X is a heteroatom selected from P, Si, S, Ge, As, Te, or Se;
b) mixing at least a portion of the curative with at least a portion of the phthalonitrile, thereby forming a polymerizable composition comprising the phthalonitrile resin, the curative, and the polyoxometalate;
c) subjecting the polymerizable composition to a temperature of 180° C. to 250° C., to form an at least partially polymerized article; and
d) subjecting the at least partially polymerized article to a temperature of 300° C. to 350° C. to complete polymerization of the article.

Generally, the polymerizable composition is heated to a temperature between about 150° C. and 300° C., such as between about 180-250° C., for a time of about 1-480 minutes. Suitable sources of heat include induction heating coils, ovens, hot plates, and heat guns, plus infrared sources including lasers, and microwave sources.

In some embodiments, the polyoxometalate is mixed with the curative by mixing the polyoxometalate with a solvent to form a polyoxometalate composition, mixing the curative with a solvent to form a curative composition, combining the polyoxometalate composition with the curative composition, and removing the solvent.

Often, the polyoxometalate is obtained by dehydrating a polyoxometalate hydrate. In certain embodiments, the method of incorporation of the POM in the resin is accomplished by dissolution of the POM in a suitable solvent. The hydrated POM or dehydrated POM is dissolved in a solvent that is preferably a polar aprotic solvent. In some embodiments, the polyoxometalate is dehydrated during step a) of the method by mixing the polyoxometalate hydrate with a solvent to form a polyoxometalate composition, mixing the phthalonitrile with a solvent at elevated temperature to form a phthalonitrile composition, combining the polyoxometalate composition with the phthalonitrile composition, and removing the solvent.

Preferred solvents include at least one of a ketone, an acetate, or an amide, such as acetone, methyl ethyl ketone (MEK), ethyl acetate, butyl acetate, diacetone alcohol, methyl isobutyl ketone (MIBK), dimethyl formamide, acetamide, and dimethyl sulfoxide (DMSO). Of these, MEK and MIBK are most preferred for dissolution of the POM. It is preferred that the solvent also be miscible with the phthalonitrile resin system. Dispersion of the POM in the resin system can be accomplished by heating the resin system to a melt and mixing with the POM solution, followed by stripping of the solvent. The selection of the solvent (e.g., MIBK) can also assist in the removal of water from the system if a hydrated POM is incorporated into the system. In some embodiments, it is most preferred to dehydrate the POM before dissolution in a solvent. The use of hydrated POM can be problematic due to the finding of Snow and Jarvis who showed that moisture leads to the formation of triazine crosslinks rather than phthalocyanine. For the Keggin structured tungstate POMs, dehydration can be accomplished by drying the POMs at a temperature of 300° C. The tungstate and molybdate POMs have good thermal stability up to temperatures over 400° C., which makes them suitable for incorporation in the phthalonitrile polymerized network.

As previously mentioned, current phthalonitrile resin systems (phthalonitrile resin containing at least one multifunctional phthalonitrile resin component+curative (e.g., aniline or phenol)) are limited by long time high temperature multistep autoclave cure schedules that require temperatures >350° C. for an extended time. These lengthy post cures are meant to drive high extent of polymerization of the phthalonitrile. The POM was unexpectedly discovered to be effective in selectively promoting phthalocyanine formation over triazine formation and in shortening the post cure time and temperature for formation of phthalocyanine. The POMs did not behave like the acid curatives described by Keller that resulted in a mainly triazine linked polymer network. Instead, the (acidic) POMs appear to favor phthalocyanine formation and limit the formation of triazine, which is the opposite of the impact of acids described by Keller. The POMs were found to be poor initiators of phthalonitrile polymerization by themselves, unlike the acid curatives of Keller. (U.S. Pat. No. 5,247,060 to Keller.) The polymerization of the phthalonitrile with POM is preferably performed with the addition of an amine or phenol curative. The POM was found to be more effective in selectively promoting phthalocyanine over triazine when the POM is initially dehydrated before incorporation into the phthalonitrile resin system. This is shown by IR spectroscopy results of the phthalonitrile networks, monitoring the IR relative absorbance of the phthalocyanine ring vibration at 1091 cm$^{-1}$ and 1010 cm$^{-1}$ and the triazine absorptions at 1510 cm$^{-1}$ and 1355 cm$^{-1}$, shown in the Examples. The combination of the POM with an amine or phenol curative acts in an opposite manner to what was seen for the amine acid salt curatives of Burchill and Keller, who found networks to be triazine dominant. (Burchill, P. J., *On the formation and properties of a high-temperature resin from a bisphthalonitrile*. Journal of Polymer Science Part A: Polymer Chemistry, 1994. 32(1): p. 1-8; and U.S. Pat. No. 5,237,045 to Burchill et al.)

As shown in the Examples, phthalonitrile networks containing POM are compared to a comparative phthalonitrile network containing no POM. The phthalonitrile networks containing POM have lower triazine absorptions and higher phthalocyanine absorptions compared to the network with no POM. The networks containing POM are deeper green in color than the networks containing no POM, which have a yellow brown tint to the green color. The deeper green color of the networks containing POM provides evidence of the greater concentration of phthalocyanine, which was quantified by IR spectroscopy. The phthalonitrile polymerized network that initially incorporated dehydrated POM has the lowest amounts of triazine and the highest amounts of phthalocyanine. The hydrated POM was moderately effective in promoting phthalocyanine formation over triazine when a solvent (e.g., MIBK) is used that assists the removal of moisture from the resin system, but as Snow and Jarvis showed, even small amounts of water in the resin system will favor triazine formation. This was also found to be true when comparing the incorporation of hydrated POM and dehydrated POM in a phthalonitrile resin system, even though some of the hydrated water gets removed during the solvent stripping process. There was still a small amount of water bound to the POM that affected the ratio of triazine formation to phthalocyanine formation. Therefore, it is preferred to dehydrate the POM before introduction into the phthalonitrile resin system to optimize the extent of phthalocyanine formation. Also, it has been found that use of larger amounts of POM are more effective than smaller amounts of POM in favoring phthalocyanine formation; however, even a small amount of POM (e.g., as little as 1 weight percent %) was discovered to increase the amount of phthalocyanine formation as compared to no POM in the phthalonitrile resin system.

In addition to promoting the formation of phthalocyanine over triazine, the POM was also unexpectedly discovered to shift the cure initiation temperature of the aniline with a phthalonitrile resin to a higher temperature. This is evidenced in the Examples by differential scanning calorimetry (DSC) measurement of the polymerization exothermic reaction by the shift of the cure initiation temperature to higher temperature. Without wishing to be bound by theory, the presence of the POM is believed to increase the apparent activation energy of phthalonitrile polymerization through interaction of the POM and the aromatic amine functional curative. This thus shifts initiation of phthalonitrile polymerization to a higher temperature and opens up the temperature processing window of the liquid monomer resin, enabling the processing of liquid resin to a higher temperature without network gelation. The delay in cure initiation does not require the POM to be dehydrated before incorporation in the polymerized network. Also, this effect was found to be independent of the method used to incorporate the POM into the resin. This is beneficial for expanding the resin processing temperature window, enabling more time to process the phthalonitrile resin system into an article before gelation of the resin.

The presence of the POM was further found to increase the polymerization exothermic enthalpy of reaction, as shown in the Examples. A greater enthalpy of reaction means that the polymerization reaction achieves a higher extent of conversion during the first stage of the reaction. A higher extent of conversion during the first stage of the reaction means that less time and temperature is needed during a post cure thermal treatment to drive polymer network conversion. Thus, the presence of the POM has been discovered to be effective in shortening the time and lowering the post cure temperature of the phthalonitrile polymerized network, as shown in the Examples. For instance, the inclusion of a POM has been demonstrated to reduce the post cure time by a factor of three. Phthalonitrile resin systems containing a POM achieved optimal strength by a post cure of 3 hours at 325° C. and 8 hours at 300° C., compared to 6 hours at 325° C. and 24 hours at 300° C. for networks that did not contain a POM. In the demonstrated examples of the present disclosure, the highest post cure temperature required was 325° C., and no temperature of >350° C. was employed. A reduction of the total cure cycle time is beneficial for reducing the manufacturing cost of phthalonitrile articles. POM loaded phthalonitrile resin systems described herein have demonstrated a reduction in the cure cycle time by factor of three compared to the same phthalonitrile resin system in the absence of POM.

In addition, the POM loaded phthalonitrile polymerized networks have unexpectedly demonstrated an improvement in tensile break strength of 40% or greater, a break strain of 70% or greater, and a fracture toughness, K1c, of 10% or greater. In some embodiments, an article comprising a polymerization product (e.g., polymerized network) of the phthalonitrile polymerizable compositions described herein exhibits a tensile ultimate strength of 75 megapascals (MPa) or greater, 77 MPa or greater, 79 MPa or greater, 80 MPa or greater, 82 MPa or greater, 84 MPA or greater, 86 MPa or greater, or 88 MPa or greater; and a tensile ultimate strength of 100 MPa or less. Tensile ultimate strength can be measured as described in detail in the Examples below. In some embodiments, an article comprising a polymerization product of the phthalonitrile polymerizable compositions described herein exhibits a tensile ultimate strain of 3% or greater, 3.1% or greater, 3.2% or greater, 3.3% or greater, 3.4% or greater, 3.5% or greater, 3.6% or greater, 3.7% or greater, 3.8% or greater, 3.9% or greater, or 4.0% or greater; and a tensile ultimate strain of 5% or less. Tensile ultimate strain can be measured as described in detail in the Examples below.

Without wishing to be bound by theory, the improved mechanical properties may be attributed to the improved cure of the network possibly achieving a greater degree of network formation in a shorter time period. The mechanism for an increase in network strength and break strain is unknown. It is known that POM can interact with organic amines through polar intermolecular interactions and the polymerized phthalonitrile network possess many organic amines in the polymer network. Possibly this type of intermolecular interaction may have a network fortification effect enabling the POM to enhance the strength and break strain of the network.

Example suitable phthalonitrile resins as the one or more phthalonitrile resin(s) in polymerizable compositions according to the present disclosure include for instance and without limitation, bis(3,4-dicyanophenyl) ether of bisphenol A, bis(2,3-dicyanophenyl) ether of bisphenol A, bis(3,4-dicyanophenyl) ether of bisphenol AP, bis(3,4-dicyanophenyl) ether of bisphenol AF, bis(3,4-dicyanophenyl) ether of bisphenol B, bis(3,4-dicyanophenyl) ether of bisphenol BP, bis(3,4-dicyanophenyl) ether of bisphenol C, bis(3,4-dicyanophenyl) ether of bisphenol C2, bis(3,4-dicyanophenyl) ether of bisphenol E, bis(3,4-dicyanophenyl) ether of bisphenol F, bis(3,4-dicyanophenyl) ether of 3,3',5,5'-tetramethylbisphenol F, bis(3,4-dicyanophenyl) ether of bisphenol FL, bis(3,4-dicyanophenyl) ether of bisphenol G, bis(3,4-dicyanophenyl) ether of bisphenol M, bis(3,4-dicyanophenyl) ether of bisphenol S, bis(3,4-dicyanophenyl) ether of bisphenol P, bis(3,4-dicyanophenyl) ether of bisphenol PH, bis(3,4-dicyanophenyl) ether of bisphenol T, bis(3,4-dicyanophenyl) ether of bisphenol TMC, bis(3,4-dicyanophenyl) ether of bisphenol Z, bis(3,4-dicyanophenyl) ether of 4,4'-dihydroxybiphenyl, bis(3,4-dicyanophenyl) ether of 4,4'-dihydroxydiphenyl ether, bis(3,4-dicyanophenyl) ether of catechol, bis(3,4-dicyanophenyl) ether of 4,4'-dihydroxybenzophenone, 3,4-dicyanophenyl ether of phenol, 2,3-dicyanophenyl ether of phenol, 4-tert-butylphthalonitrile, 4-butoxyphthalonitrile, 3,4-dicyanophenyl ether of 4-cumylphenol, 3,4-dicyanophenyl ether of 2-allylphenol, 3,4-dicyanophenyl ether of eugenol, bis(3,4-dicyanophenyl) ether of resorcinol. In certain embodiments, a suitable phthalonitrile resin is independently selected from bis(3,4-dicyanophenyl) ether of resorcinol, bis(3,4-dicyanophenyl) ether of bisphenol A, bis(3,4-dicyanophenyl) ether of bisphenol M, bis(3,4-dicyanophenyl) ether of bisphenol T, or a combination thereof. In select embodiments, the phthalonitrile resin is bis(3,4-dicyanophenyl) ether of bisphenol M. In select embodiments, the phthalonitrile resin is bis(3,4-dicyanophenyl) ether of bisphenol T. Typically, the one or more resins are a solid at 25° C.

Bis(3,4-dicyanophenyl) ether of bisphenol M is also referred to as "bisphenol M diphthalonitrile ether resin" or "BMPN". In polymerizable compositions of the present disclosure, usually BMPN is of Formula IV:

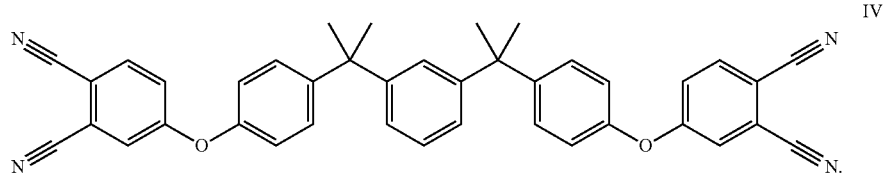 [SMILES: CC(C)(c1ccc(Oc2ccc(C#N)c(C#N)c2)cc1)c1cccc(C(C)(C)c2ccc(Oc3ccc(C#N)c(C#N)c3)cc2)c1]

IV

Bis(3,4-dicyanophenyl) ether of bisphenol T is also referred to as "bisphenol T diphthalonitrile ether resin" or "BTPN". In polymerizable compositions of the present disclosure, usually BTPN is of Formula V:

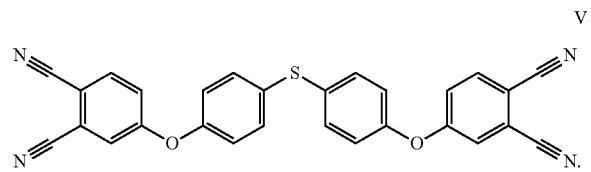 [SMILES: N#Cc1ccc(Oc2ccc(Sc3ccc(Oc4ccc(C#N)c(C#N)c4)cc3)cc2)cc1C#N]

V

In certain embodiments, the phthalonitrile resin comprises a bisphenol M diphthalonitrile ether resin of Formula IV. In some embodiments, the phthalonitrile resin comprises a bisphenol T diphthalonitrile ether resin of Formula V. In certain embodiments, the phthalonitrile resin comprises a resorcinol diphthalonitrile ether resin.

When two phthalonitrile resins are included in the polymerizable compositions, the amounts of the two phthalonitrile resins is not particularly limited. In some embodiments, a weight ratio of a first phthalonitrile resin to a second phthalonitrile resin ranges from 10:90 to 90:10, inclusive; or from 15:85 to 85:15, inclusive; or from 30:70 to 70:30, inclusive. In certain embodiments, the polymerizable composition comprises a blend of each of the monomers of Formula IV, Formula V, and resorcinol diphthalonitrile ether resin (RPN).

Synthesis of BMPN, RPN, and BTPN can be achieved by the nucleophilic substitution of the nitro group of 4-nitrophthalonitrile by phenolic residues of the bisphenols catalyzed by potassium carbonate in DMSO. The reactions can be conducted at ambient temperature under a nitrogen atmosphere.

Suitable optional catalysts include for instance and without limitation, a base such as 1,5-diazabicyclo(4.3.0)non-5-ene or 1,8-diazabicyclo[5.4.0]undec-7-ene; reducing agents such as hydroquinone and 1,2,3,6-tetrahydropyridine; metal, organometals or metal salts such as copper, iron, copper acetylacetonate, zinc naphthenate, dibutyltin dilaurate, stannous chloride, stannic chloride, copper chloride, iron chloride, and/or calcium carbonate.

Certain other optional additives may also be included in polymerizable compositions according to the present disclosure, including, for example, tougheners, fillers, and combinations thereof. Such additives provide various functions. For instance, a toughening agent such as organic particles, may add strength to the composition after curing without interfering with curing. It will be understood by one of skill in the art that one compound may form two or more different functions. For example, a compound may function as both a toughening agent and a filler. In some embodiments, such additives will not react with the resins of the polymerizable composition. In some embodiments, such additives may include reactive functional groups, particularly as end groups. Examples of such reactive functional groups include, but are not limited to, amines, thiols, alcohols, epoxides, vinyls, and combinations thereof.

Useful toughening agents are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxy from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl (C1-C4) substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would interfere with the polymerization of the resin.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of useful toughening agents includes elastomeric particles that have a glass transition temperature ($T_g$) below 25° C. before mixing with the other components of the composition. These elastomeric particles are polymerized from free radical polymerizable monomers and a copolymerizable polymeric stabilizer. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, PA), those having a core including polybutadiene and a shell including poly(methyl methacrylate) (for example, those available under the trade names KANE ACE M511, M521, B11A, B22, B31, and M901 from Kaneka Corporation, Houston, TX and CLEARSTRENGTH C223 from ATOFINA, Philadelphia, PA), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, MN, and those available under the trade name JEFFAMINE from Huntsman Chemical Co., Houston, TX Useful liquid poly-butadiene hydroxyl terminated resins include those available under the trade names LIQUIFLEX H by Petroflex of Wilmington, DE, and HT 45 by Sartomer of Exton, PN.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

Various combinations of toughening agents can be used if desired. If used, a toughening agent is present in the polymerizable composition in an amount of at least 3 wt. % or at least 5 wt. %. If used, a toughening agent is present in a polymerizable composition in an amount of no greater than 35 wt. % or no greater than 25 wt. %.

A filler to optionally be included in the polymerizable compositions according to the present disclosure is not particularly limited, and may include nanoparticles, microparticles, reinforcing discontinuous fibers, reinforcing continuous fibers, a fabric, or combinations thereof. One suitable fabric comprises a polyimide nonwoven fabric. The term "particles" encompasses nanoparticles, microparticles, and combinations thereof. For instance, particles of a metal carbide include both metal carbide nanoparticles and metal carbide microparticles. As used herein, the term "nano" or "micro" in front of a material is interchangeable with reference of that material as a nanoparticle or microparticle, respectively (e.g., "nanosilica" is interchangeable with "silica nanoparticles", "microsilica" is interchangeable with "silica microparticles", etc.).

In certain embodiments, the filler comprises a nanofiller comprising at least one of silica nanoparticles, silicon carbide nanoparticles, alumina nanoparticles, zirconia nanoparticles, magnesium oxide nanoparticles, aluminum nitride nanoparticles, boron nitride nanoparticles, dolomite nanoparticles, boehmite nanoparticles, magnesium hydroxide nanoparticles, calcium sulfate nanoparticles, barium sulfate nanoparticles, or magnesium sulfate nanoparticles. For instance and without limitation, some suitable nanoparticles include silica nanoparticles available from Nalco Company (Naperville, IL) under the trade designation NALCO 15827; and silicon carbide nanoparticles available from 3M Technical Ceramics (Kempten, Germany) under the trade designation VSN1393.

Typically, a nanofiller can be present in polymerizable compositions according to the present disclosure in an amount of 1 wt. % or more, based on the total weight of the polymerizable composition, 3 wt. %, 5 wt. %, 8 wt. %, 10 wt. %, 12 wt. %, 15 wt. %, 20 wt. %, or even 25 wt. % or more, based on the total weight of the polymerizable composition; and 40 wt. % or less, 38 wt. % or less, 36 wt. %, 34 wt. %, 32 wt. %, 30 wt. %, 28 wt. %, 26 wt. %, 24 wt. %, 22 wt. %, 20 wt. %, 18 wt. %, or 15 wt. % or less, based on the total weight of the polymerizable composition. Stated another way, a nanofiller may be present in a polymerizable composition in an amount of 1 to 40 wt. %, 1 to 20 wt. %, 3 to 15 wt. %, 20 to 40 wt. %, or 25 to 40 wt. %, based on the total weight of the polymerizable composition.

In certain embodiments, the optional filler comprises a microfiller comprising at least one of silica microparticles, silicon carbide microparticles, alumina microparticles, magnesium oxide microparticles, aluminum nitride microparticles, boron nitride microparticles, dolomite microparticles, boehmite microparticles, or glass bubbles. For instance and without limitation, some suitable microparticles include boron nitrile microparticles available from 3M Company (St. Paul, MN) under the trade designation 3M BORON NITRIDE COOLING FILLER PLATELETS; glass bubbles available from 3M Company (St. Paul, MN) under the trade designation 3M GLASS BUBBLES IM16K; and alumina microparticles available from Micron Corp (a subsidiary of the Nippon Steel and Sumikin Materials Co., Japan) under the trade designation MICRON TA6Y1 ALUMINA.

Typically, a microfiller can be present in polymerizable compositions according to the present disclosure in an amount of 1 wt. % or more, based on the total weight of the polymerizable composition, 5 wt. %, 10 wt. %, 15 wt. %, 20 wt. %, 30 wt. %, 40 wt. %, 50 wt. %, or even 60 wt. % or more, based on the total weight of the polymerizable composition; and 90 wt. % or less, 85 wt. %, 80 wt. %, 75 wt. %, 70 wt. %, 65 wt. %, 55 wt. %, 45 wt. %, 35 wt. %, or 25 wt. % or less, based on the total weight of the polymerizable composition. Stated another way, a nanofiller may be present in a polymerizable composition in an amount of 1 to 90 wt. %, 1 to 50 wt. %, 5 to 35 wt. %, 20 to 55 wt. %, or 60 to 90 wt. %, based on the total weight of the polymerizable composition.

In certain embodiments, the filler comprises particles of silica, silicon carbide, alumina, zirconia, magnesium oxide, aluminum nitride, boron nitride, dolomite, boehmite, magnesium hydroxide, calcium sulfate, barium sulfate, magnesium sulfate, or a combination thereof.

Generally, the optional surface modifiers of the present disclosure include at least a binding group and a compatibilizing segment. The compatibilizing segment is selected to improve the compatibility of filler with the curable resin. Generally, the selection of the compatibilizing group depends on a number of factors including the nature of the curable resin, the concentration of the filler, and the desired degree of compatibility. Useful compatibilizing groups include for instance and without limitation, polyalkylene oxide residues (e.g., polypropylene oxide, polyethylene oxide, and combinations thereof), aromatic residues (e.g. phenyl, phenylalkylene, substituted phenylene, and combinations thereof, carbonyl residues (e.g., ketone, ester, amide, carbamate, and combinations thereof). The binding group bonds to the particle surface, connecting the surface-modifying agent to the filler. Depending on the filler surface and the surface modifier, the surface modifier may be one or more of covalently bonded, ionically bonded, or physically bonded to a surface of the filler.

Some suitable surface modifiers comprise an organoacid, an organobase, a siloxane, a silane, or a combination thereof. The type of surface modifier will depend on the material of the filler. For instance, the surface modifier may comprise a silane or a siloxane when the filler comprises silica nanoparticles, silica microparticles, cenospheres, zirconia nanoparticles, zirconia microparticles, magnesium oxide nanoparticles, magnesium oxide microparticles, silicon carbide nanoparticles, silicon carbide microparticles, or a combination thereof. The surface modifier may comprise an organoacid or an organobase when the filler comprises magnesium oxide nanoparticles, magnesium oxide microparticles, alumina nanoparticles, alumina microparticles, dolomite nanoparticles, dolomite microparticles, boehmite nanoparticles, boehmite microparticles, or a combination thereof. The surface modifier may comprise an organoacid when the filler comprises zirconia nanoparticles, zirconia microparticles, magnesium oxide nanoparticles, magnesium oxide microparticles, or a combination thereof. At least certain embodiments of the present disclosure utilize polypropylene oxide and polyethylene oxide as the organic end of any of the surface modifiers described herein, associated with the monomer resin and polymer network.

For instance, surface modification of certain particles is described in PCT Application Publication No. WO 2017/173195 (Anderson et al.).

At temperatures near to 60 degrees Celsius, solvent is often added to reduce the viscosity of the resin. Some suitable solvents miscible with phthalonitrile resins include methyl ethyl ketone (MEK), methyl isobutyl ketone (MIBK), diacetone alcohol, dimethylformamide (DMF), and dimethyl sulfoxide (DMSO). At higher temperatures (e.g., greater than 120° C. but less than 200° C.), mixing and milling can be performed without the addition of solvent in a liquid resin melt. An advantage of high temperature mixing and milling is the removal of solvent stripping.

A surface modifying agent for a filler surface is selected such that one end of the surface modifier preferentially associates with the filler surface and the other end of the surface modifier preferentially associates with the monomer resin and maintains particle compatibility in the resin and polymerized network. The concentration of a surface modifier can be tuned to minimize free surface modifier in the resin and avoid open filler surface, both of which would catalyze phthalonitrile polymerization over 200° C.

In certain embodiments, the optional filler comprises at least one of reinforcing continuous fibers or reinforcing discontinuous fibers, for instance as described in PCT Application Publication No. WO 2017/173195 (Anderson et al.). In some embodiments, the optional reinforcing continuous fibers or reinforcing discontinuous fibers comprise at least one of carbon fibers, glass fibers, ceramic fibers, boron fibers, silicon carbide fibers, polyacrylonitrile fibers, polyimide fibers, or polyamide fibers. The amount of optional discontinuous fibers dispersed in the polymerizable composition is not particularly limited. The plurality of fibers is often present in an amount of 1 wt. % or more of the polymerizable composition, 2 wt. %, 3 wt. %, 5 wt. %, 10 wt. %, 15 wt. %, 20 wt. %, or 25 wt. % or more of the polymerizable composition; and up to 50 wt. %, 45 wt. %, 40 wt. %, or up to 35 wt. % of the polymerizable composition. In certain embodiments, the fibers are present in the polymerizable composition in an amount of 1 to 50 wt. %, 2 to 25 wt. %, or 5 to 15 wt. %, inclusive, of the polymerizable composition. In certain embodiments, discontinuous fibers are present in an amount of 5 to 50 wt. %, inclusive, of the polymerizable composition.

Other optional additives, or adjuvants, may be added to the compositions as desired. Examples of such other optional additives include as colorants, anti-oxidant stabilizers, thermal degradation stabilizers, light stabilizers, flow agents, bodying agents, flatting agents, additional fillers, binders, blowing agents, fungicides, bactericides, surfactants, plasticizers, rubber tougheners, and other additives known to those skilled in the art. Such additives are typically substantially unreactive. These adjuvants, if present, or other optional additives, are added in an amount effective for their intended purpose.

Examples of additional suitable filler materials include reinforcement-grade carbon black, fluoroplastics, clays, and any combination of any of these in any proportions.

The phrase "reinforcement-grade carbon black" as used herein, includes any carbon black with an average particle size smaller than about 10 microns. Some particularly suitable average particle sizes for reinforcement-grade carbon black range from about 9 nm to about 40 nm. Carbon black that is not reinforcement grade include carbon black with an average particle size larger than about 40 nm. Carbon nanotubes are also useful fillers. Carbon black fillers are typically employed as a means to balance, elongation, hardness, abrasion resistance, conductivity, and processability of compositions. Suitable examples include MT blacks (medium thermal black) designated N-991, N-990, N-908, and N-907; FEF N-550; and large particle size furnace blacks.

Further useful fillers include diatomaceous earth, barium sulfate, talc, and calcium fluoride. The choice and amounts of optional components depend on the needs of the specific application.

Various embodiments are provided that include polymerizable compositions, articles, and methods.

In a first embodiment, the present disclosure provides a polymerizable composition. The polymerizable composition comprises a phthalonitrile resin; a curative; and a polyoxometalate of Formula I: $H_n[XM_{12}O_{40}]$ (I). In Formula I, M is W or Mo, n is 1 to 6, and X is a heteroatom selected from P, Si, S, Ge, As, Te, or Se.

In a second embodiment, the present disclosure provides a polymerizable composition according to the first embodiment, wherein in Formula I, M is W.

In a third embodiment, the present disclosure provides a polymerizable composition according to the first embodiment or the second embodiment, wherein the polyoxometalate is $H_3[P(W_3O_{10})_4]$ or $H_4[Si(W_3O_{10})_4]$.

In a fourth embodiment, the present disclosure provides a polymerizable composition according to the polymerizable composition according to the first embodiment or the second embodiment, wherein the polyoxometalate is $H_3[P(W_3O_{10})_4]$.

In a fifth embodiment, the present disclosure provides a polymerizable composition according to the polymerizable composition according to the first embodiment, wherein in Formula I, M is Mo.

In a sixth embodiment, the present disclosure provides a polymerizable composition according to the polymerizable composition according to the first embodiment or the fifth embodiment, wherein the polyoxometalate is $H_3[P(Mo_3O_{10})_4]$.

In a seventh embodiment, the present disclosure provides a polymerizable composition according to any of the first through sixth embodiments, wherein the phthalonitrile resin comprises at least one of bis(3,4-dicyanophenyl) ether of bisphenol M, bis(3,4-dicyanophenyl) ether of bisphenol T, bis(3,4-dicyanophenyl) ether of bisphenol P, bis(3,4-dicyanophenyl) ether of resorcinol, bis(3,4-dicyanophenyl) ether of bisphenol A, bis(2,3-dicyanophenyl) ether of bisphenol A, bis(3,4-dicyanophenyl) ether of bisphenol AP, bis(3,4-dicyanophenyl) ether of bisphenol AF, bis(3,4-dicyanophenyl) ether of bisphenol B, bis(3,4-dicyanophenyl) ether of bisphenol BP, bis(3,4-dicyanophenyl) ether of bisphenol C, bis(3,4-dicyanophenyl) ether of bisphenol C2, bis(3,4-dicyanophenyl) ether of bisphenol E, bis(3,4-dicyanophenyl) ether of bisphenol F, bis(3,4-dicyanophenyl) ether of 3,3',5,5'-tetramethylbisphenol F, bis(3,4-dicyanophenyl) ether of bisphenol FL, bis(3,4-dicyanophenyl) ether of bisphenol G, bis(3,4-dicyanophenyl) ether of bisphenol M, bis(3,4-dicyanophenyl) ether of bisphenol P, bis(3,4-dicyanophenyl) ether of bisphenol PH, bis(3,4-dicyanophenyl) ether of bisphenol S, bis(3,4-dicyanophenyl) ether of bisphenol T, bis(3,4-dicyanophenyl) ether of bisphenol TMC, bis(3,4-dicyanophenyl) ether of bisphenol Z, bis(3,4-dicyanophenyl) ether of 4,4'-dihydroxybiphenyl, bis(3,4-dicyanophenyl) ether of 4,4'-dihydroxydiphenyl ether, bis(3,4-dicyanophenyl) ether of catechol, bis(3,4-dicyanophenyl) ether of 4,4'-dihydroxybenzophenone, 3,4-dicyanophenyl ether of phenol, 2,3-dicyanophenyl ether of phenol, 4-tert-butylphthalonitrile, 4-butoxyphthalonitrile, 3,4-dicyanophenyl ether of 4-cumylphenol, 3,4-dicyanophenyl ether of 2-allylphenol, or 3,4-dicyanophenyl ether of eugenol.

In an eighth embodiment, the present disclosure provides a polymerizable composition according to any of the first through seventh embodiments, wherein the phthalonitrile resin comprises at least one of bis(3,4-dicyanophenyl) ether of bisphenol M, bis(3,4-dicyanophenyl) ether of bisphenol T, or bis(3,4-dicyanophenyl) ether of resorcinol.

In a ninth embodiment, the present disclosure provides a polymerizable composition according to any of the first through eighth embodiments, wherein the phthalonitrile resin comprises bis(3,4-dicyanophenyl) ether of bisphenol M.

In a tenth embodiment, the present disclosure provides a polymerizable composition according to any of the first through ninth embodiments, wherein the curative comprises at least one of an aniline functionality or a phenol functionality.

In an eleventh embodiment, the present disclosure provides a polymerizable composition according to any of the first through tenth embodiments, wherein the curative comprises an aniline functional phthalonitrile.

In a twelfth embodiment, the present disclosure provides a polymerizable composition according to any of the first through eleventh embodiments, wherein the curative comprises a dianiline functionality.

In a thirteenth embodiment, the present disclosure provides a polymerizable composition according to any of the first through twelfth embodiments, wherein the curative comprises at least one of 4,4'-(1,3-phenylenedioxy)dianiline, 4,4'-(1,4-phenylenedioxy)dianiline, bis[4-(4-aminophenoxy)phenyl]sulfone, 4,4'-(4,4'-isopropylidenediphenyl-1,1'-diyldioxy)dianiline, 4,4'-(1,3-phenylenediisopropylidene)dianiline, 4,4'-(1,4-phenylenediisopropylidene)dianiline, 4,4'-(1,1'-biphenyl-4,4'-diyldioxy)dianiline, 4,4'-methylenedianiline, 4,4'-sulphonyldianiline, 4,4'-methylene-bis(2-methylaniline), 3,3'-methylenedianiline, 3,4'-methylenedianiline, 4,4'-oxydianiline, 4,4'-(isopropylidene)dianiline, 4,4'-(hexafluoroisopropylidene)dianiline, 4,4'-(hexafluoroisopropylidene)bis(p-phenyleneoxy)dianiline, or 4,4'-diaminobenzophenone.

In a fourteenth embodiment, the present disclosure provides a polymerizable composition according to any of the first through thirteenth embodiments, wherein the curative comprises a phenol functionality.

In a fifteenth embodiment, the present disclosure provides a polymerizable composition according to any of the first through fourteenth embodiments, wherein the curative comprises a phenol functional phthalonitrile.

In a sixteenth embodiment, the present disclosure provides a polymerizable composition according to any of the first through fifteenth embodiments, wherein the curative comprises at least one of 4-(4-aminophenoxy)phthalonitrile, 1,3-bis(3-aminophenoxy)benzene, 4-(3-aminophenoxy)phthalonitrile, or 9,9-bis(4-amino-3-chlorophenyl)fluorene.

In a seventeenth embodiment, the present disclosure provides a polymerizable composition according to any of the first through sixteenth embodiments, wherein the curative comprises 4-(4-aminophenoxy)phthalonitrile.

In an eighteenth embodiment, the present disclosure provides a polymerizable composition according to any of the first through seventeenth embodiments, further comprising at least one filler.

In a nineteenth embodiment, the present disclosure provides a polymerizable composition according to any of the first through eighteenth embodiments, wherein the filler comprises at least one of reinforcing continuous fibers or reinforcing discontinuous fibers, a fabric, a nanofiller, or a microfiller.

In a twentieth embodiment, the present disclosure provides a polymerizable composition according to the nineteenth embodiment, wherein the nanofiller comprises at least one of silica nanoparticles, silicon carbide nanoparticles, alumina nanoparticles, zirconia nanoparticles, magnesium oxide nanoparticles, aluminum nitride nanoparticles, boron nitride nanoparticles, dolomite nanoparticles, boehmite nanoparticles, magnesium hydroxide nanoparticles, calcium sulfate nanoparticles, barium sulfate nanoparticles, or magnesium sulfate nanoparticles.

In a twenty-first embodiment, the present disclosure provides a polymerizable composition according to the nineteenth embodiment or the twentieth embodiment, wherein the microfiller comprises at least one of silica microparticles, silicon carbide microparticles, alumina microparticles, magnesium oxide microparticles, aluminum nitride microparticles, boron nitride microparticles, dolomite microparticles, boehmite microparticles, or glass bubbles.

In a twenty-second embodiment, the present disclosure provides a polymerizable composition according to any of the nineteenth through twenty-first embodiments, wherein the reinforcing continuous fibers or reinforcing discontinuous fibers comprise at least one of carbon fibers, glass fibers, ceramic fibers, boron fibers, silicon carbide fibers, polyacrylonitrile fibers, polyimide fibers, or polyamide fibers.

In a twenty-third embodiment, the present disclosure provides a polymerizable composition according to any of the nineteenth through twenty-second embodiments, wherein the fabric comprises a polyimide nonwoven fabric.

In a twenty-fourth embodiment, the present disclosure provides an article. The article comprises a polymerization product of the polymerizable composition of any of the first through twenty-third embodiments.

In a twenty-fifth embodiment, the present disclosure provides an article according to the twenty-fourth embodiment, exhibiting a tensile ultimate strength of 75 megapascals (MPa) or greater.

In a twenty-sixth embodiment, the present disclosure provides an article according to the twenty-fourth embodiment or the twenty-fifth embodiment, exhibiting a tensile ultimate strain of 3% or greater.

In a twenty-seventh embodiment, the present disclosure provides a method of making an article. The method comprises a) mixing a polyoxometalate with at least one of a curative or phthalonitrile resin and b) mixing at least a portion of the curative with at least a portion of the phthalonitrile, thereby forming a polymerizable composition comprising the phthalonitrile resin, the curative, and the polyoxometalate. The polyoxometalate is of Formula I: $H_n[XM_{12}O_{40}]$ (I). In Formula I, M is W or Mo, n is 1 to 6, and X is a heteroatom selected from P, Si, S, Ge, As, Te, or Se. The method further comprises c) subjecting the polymerizable composition to a temperature of 180° C. to 250° C., to form an at least partially polymerized article, and d) subjecting the at least partially polymerized article to a temperature of 300° C. to 350° C. to complete polymerization of the article.

In a twenty-eighth embodiment, the present disclosure provides a method according to the twenty-seventh embodiment, wherein the polyoxometalate is obtained by dehydrating a polyoxometalate hydrate.

In a twenty-ninth embodiment, the present disclosure provides a method according to the twenty-seventh or the twenty-eighth embodiment, wherein the polyoxometalate is mixed with the curative by mixing the polyoxometalate with a solvent to form a polyoxometalate composition, mixing the curative with a solvent to form a curative composition, combining the polyoxometalate composition with the curative composition, and removing the solvent.

In a thirtieth embodiment, the present disclosure provides a method according to the twenty-eighth embodiment, wherein the polyoxometalate is dehydrated during step a) by mixing the polyoxometalate hydrate with a solvent to form a polyoxometalate composition, mixing the phthalonitrile with a solvent at elevated temperature to form a phthalonitrile composition, combining the polyoxometalate composition with the phthalonitrile composition, and removing the solvent.

In a thirty-first embodiment, the present disclosure provides a method according to the twenty-ninth or the thirtieth embodiment, wherein the solvent comprises at least one polar aprotic solvent.

In a thirty-second embodiment, the present disclosure provides a method according to any of the twenty-ninth through thirty-first embodiments, wherein the solvent comprises at least one of a ketone, an acetate, or an amide.

In a thirty-third embodiment, the present disclosure provides a method according to any of the twenty-ninth through thirty-second embodiments, wherein the solvent comprises at least one of acetone, methyl ethyl ketone, ethyl acetate, butyl acetate, diacetone alcohol, methyl isobutyl ketone, dimethyl formamide, acetamide, or dimethyl sulfoxide.

EXAMPLES

Advantages and embodiments of this disclosure are further illustrated by the following examples, but the particular materials and amounts thereof recited in these examples, as well as other conditions and details, should not be construed to unduly limit this invention. Unless otherwise noted or readily apparent from the context, all parts, percentages, ratios, etc. in the Examples and the rest of the specification are by weight.

Materials Used in the Examples

| Abbreviation | Description and Source |
| --- | --- |
| PTA | Phosphotungstate CAS 12067-99-1; Sigma Aldrich Chemical Company, St. Louis, MO |
| STA | Silicotungstate CAS 12027-43-9; Sigma Aldrich Chemical Company, St. Louis, MO |
| MPA | 12-MolybdoPhosphoric acid hydrate (CAS 51429-74-4); Alfa Aesar, Tewksbury, MA |
| NALCO 15827 | 140 nm diameter silica aqueous sol, Nalco Company, Naperville, IL |
| PAPS | N-phenyl amino propyl trimethoxy silane, Gelest, Morrisville, PA |
| PS | Phenyl trimethoxy silane, Gelest, Morrisville, PA |
| DMSO | Dimethyl sulfoxide, Sigma Aldrich Chemical Company, St. Louis, MO |

-continued

| Abbreviation | Description and Source |
|---|---|
| Potassium carbonate | Sigma Aldrich Chemical Company, St. Louis, MO |
| Methanol | Methanol; Alfa Aesar, Tewksbury, MA |
| Acetone | Acetone; Alfa Aesar, Tewksbury, MA |
| MEK | Methy ethyl Ketone; Alfa Aesar, Tewksbury, MA |
| MIBK | Methyl isobutyl ketone, Alfa Aesar, Tewksbury, MA |
| 4-Aminophenol | Sigma Aldrich Chemical Company, St. Louis, MO |
| 3-Aminophenol | Sigma Aldrich Chemical Company, St. Louis, MO |
| 4-nitrophthalonitrile | Sigma Aldrich Chemical Company, St. Louis, MO |
| 1-methoxy-2-propanol | Alfa Aesar, Tewksbury, MA |
| Butyl acetate | Alfa Aesar, Tewksbury, MA |
| Ethyl acetate | Alfa Aesar, Tewksbury, MA |
| APB | 1,3-bis(3-aminophenoxy)benzene; CAS 2479-46-1, Sigma Aldrich Chemical Company, St. Louis, MO |
| CAF | 9,9-Bis(4-amino-3-chlorophenyl)fluorene, CAS 107934-68-9, TCI America, Portland, OR |
| biphenol | 4,4'-biphenol, Sigma Aldrich Chemical Company, St. Louis, MO |
| Bisphenol FL | 4,4'-(9-Fluorenylidene)diphenol, Sigma Aldrich Chemical Company, St. Louis, MO |
| 4APOPN | 4-(4-aminophenoxy)phthalonitrile; prepared as described in Preparatory Example 1 |
| 3APOPN | 4-(3-aminophenoxy)phthalonitrile; prepared as described in Preparatory Example 2 |
| BMPN | Bisphenol M diphthalonitrile (i.e. bis(3,4-dicyanophenyl) ether of bisphenol M); prepared as described in Preparatory Example A of PCT Publication No. WO 2017/173040 |
| BTPN | Bisphenol T diphthalonitrile (i.e. bis(3,4-dicyanophenyl) ether of bisphenol T); prepared as described in Preparatory Example C of PCT Publication No. WO 2017/173040 |
| RPN | Resorcinol diphthalonitrile (i.e., bis(3,4-dicyanophenyl) ether of resorcinol); prepared as described in Preparatory Example B of PCT Publication No. WO 2017/173040 |

Test Methods

Method of Measuring Cure Reaction Exotherm Via Differential Scanning Calorimeter (DSC)

A TA Instruments Q Series DSC (obtained from TA Instruments, New Castle, DE) was used to measure the dynamic heat flow of a material under application of a constant thermal ramp rate. Approximately 5 mg of resin was weighed into an aluminum DSC pan. The sample pan was loaded into the DSC instrument, and the heat flow of the sample was measured in a dynamic DSC measurement with a thermal ramp rate of 1° C./minute.

Method of Measuring the Dynamic Moduli and the Glass to Rubber Transition Temperature Via a Dynamic Mechanical Analyzer (DMA)

A TA Instruments Q Series DMA (obtained from TA Instruments, New Castle, DE) was used to measure low strain linear viscoelastic properties. Dynamic mechanical measurements were performed using single cantilever beam geometry. The low strain in-phase and out-of-phase deformation response was measured when applying a continuous oscillatory force with a controlled deformation amplitude of 20 um at a frequency of 1 Hz, and the resulting storage and loss moduli and loss tangent were calculated ramping the temperature during the measurement. The temperature was ramped at 3° C./minute over a temperature range spanning the glass to rubber transition. The glass transition temperature was characterized by the storage modulus (E') onset temperature, the loss modulus (E") peak temperature, and the loss tangent (tan d) peak temperature.

Method of Measuring Fourier Transform Infrared (FTIR) Absorbance Spectroscopy

A Thermo Scientific Nicolet 6700 FTIR spectrometer with Smart iTR accessory (obtained from Thermo Fisher Scientific, Waltham, MA) was used to measure infrared absorbance by attenuated total reflectance (ATR). The spectral absorbance that define the triazine and phthalocyanine structures were measured for the phthalonitrile polymerized polymer network.

Method for Measuring the Tensile Properties of the Polymerized Polymer Networks were Measured According to ASTM D638

Specimen dimensions and measurement method followed ASTM D638-14 "Standard Test Method for Tensile Properties of Plastics". Six type 1 specimens with a thickness of 0.125" (3.18 mm) were loaded and the displacement was measured to break failure. Mean property measurements and standard deviation error limits were calculated based on specimen dimensions and load versus displacement measurements. Specimens 20 were tested on a MTS Sintech 10/D load frame (obtained from MTS, Eden Prairie, MN) with a traceable calibration.

Method of Measuring the Fracture Toughness of the Polymerized Polymer Networks were Measured According to ASTM D5045:

Specimen dimensions and measurement method followed ASTM D5045 Plane-Strain Fracture Toughness and Strain Energy Release Rate of Plastic Materials. Six square specimens with dimensions of 1.25"×1.20"×0.25" (3.175 cm×3.048 cm×0.635 cm) were notched and pre-cracked according to the D5045 specification. $K_{1C}$ measurements were calculated from the measured $P_Q$ load in a continuous loading experiment to initiate crack propagation. Specimens were tested on a MTS load frame with a traceable calibration.

Method for Dehydration of PTA or STA or MPA Polyoxometalate

Hydrated PTA, STA and MPA from the manufacturer were dehydrated at elevated temp under vacuum. Hydrated PTA, STA, or MPA was weighed into an aluminum pan and heated in a vacuum oven at 300° C. for 24 hours.

Method for Dispersion of Dehydrated PTA or STA, or MPA in 4APOPN or 3APOPN Phthalonitrile Resin 10 g of dehydrated PTA (or STA) (2.5 g of MPA) was weighed into a round bottom flask. 20 g of MEK was added to the flask and heated on a rotovap to 79° C. 30 g of 4APOPN or 3APOPN (15 g for MPA) was dissolved in about 60 g of MEK in a beaker on a hot plate set to 50° C. with stirring. When the PTA (or STA, MPA) solution on the rotovap reached boiling and the PTA (or STA, MPA) had dissolved, the warm 4APOPN or 3APOPN dissolved in MEK was added to the PTA (or STA, MPA) solution flask on the rotovap. The combined solutions were heated on the rotovap and the MEK was stripped from the solution. Modest reduced pressure was used but the blend was maintained hot to prevent solidification of the 4APOPN (or 3APOPN) and remain as a melt. When the majority of the MEK was removed, the temperature was increased and the POM-4APOPN or 3-APOPN-POM blend was stripped under reduced pressure at a temperature of 150° C. for about 20 minutes. The POM-4APOPN or POM-3APOPN was removed from the flask by pouring the mixture into an aluminum pan and allowed to cool to a solid sheet. The solidified sheet was then broken up and the amount of material collect was 40.0 g of POM-4APOPN or POM-3APOPN (17.5 g for the MPA-APOPN blend).

Method of Dispersion of Hydrated PTA or STA or MPA in BMPN Phthalonitrile Resin 15 g of hydrated PTA or STA (or 5 g of the MPA) was weighed into a round bottom flask. 60 g of MIBK was added to the flask. The hydrated POM dissolved in the MIBK with stirring. 85 g of BMPN was dissolved in 170 g of MIBK (121° C.) by heating to 120° C. in a round bottom flask. The hydrated POM-MIBK solution was added to the hot BMPN-MIBK solution and mixed on a rotovap. The combined solutions were then heated on the rotovap and the MIBK was removed under reduced pressure at 121° C. When the majority of the MIBK was removed, the temperature was increased to 180° C. and residual MIBK was removed under reduced pressure for 1 hour. The POM-BMPN was removed from the rotovap flask and poured into an aluminum pan and allowed to cool to a solid sheet. The solidified sheet was broken up and the amount of material collected was about 103 g of BMPN-POM. The POM-BMPN material was analyzed by DSC measurement to measure the ability of the POM to induce polymerization of the BMPN. The POM loaded resin exhibited no measurable exothermic reactivity when measured up to 250° C.

Method for Preparing PS/PAPS Surface Functionalized-Nanosilica 249.5 kg of NALCO 15827 was added to a kettle with stirring. A premix of 1.0525 kg of trimethoxyphenylsilane and 1356 kg of N-phenylaminopropyltrimethoxy silane in 203.2 kg of 1-methoxy-2-propanol was pumped into the kettle containing the NALCO 15827 and mixed for 30 minutes. The solution was pumped into a hot tube reactor as described in U.S. Pat. No. 8,394,977 with a reaction temperature of 149° C. and pressure of 20.4 atmospheres (2.07 MPa). Mixture was held at 149° C. for 35 minutes, then cooled to ambient temperature. 200 g of PS/PAPS-nanosilica suspension in water/1-methoxy-2-propanol was stripped of water using a BUCHI ROTAVAPOR R-215 with back additions of 1-methoxy-2-propanol. The final solution was 54.8 wt. % PS/PAPS-nanosilica in 1-methoxy-2-propanol.

Method for Preparation of Nanosilica Filled Phthalonitrile Resin of Example 2

18.25 g of silica sol (54.8% PS-PAPS/nanosilica solids in methoxypropanol) was weighed into a 125 mL glass jar. 8.25 g of butyl acetate was added to the silica sol. The jar was sealed with a rotovap compatible seal and heated on the rotovap at a bath temp of 110° C. Separately, 33 g of a PN resin blend of BMPN (66 wt. %) and BTPN (33 wt. %) was melt blended at 220° C. in an aluminum pan. The resin was cooled and then 30 g of the PN resin blend was added to a 125 mL glass jar and melted in an oven at 125° C. 30 mL of butyl acetate was heated on a hot plate to 110° C. in a 100 mL beaker. When the PN resin blend was equilibrated at 125° C. in the oven, the jar was removed. The hot butyl acetate was added to the resin. The jar was capped, and the contents were mixed vigorously until the PN resin and butyl acetate were homogeneous. The jar with silica sol was removed from the rotovap, and the hot PN resin blend/butyl acetate solution was dumped into the silica sol.

10 mL of additional butyl acetate was used to rinse all of the PN resin blend/butyl acetate solution into the silica sol jar. The jar now containing both the silica sol and PN resin blend/butyl acetate solutions was placed back on the rotovap and mixed. The bath temp was increased to 125° C., and the butyl acetate was stripped from the resin with small amounts of reduced pressure. When the majority of the butyl acetate had been removed, the temperature of the bath was increased to 180° C. and stripped for 60 minutes. The jar was then removed from the rotovap and the silica filled resin was dumped into an aluminum pan. The resin in the aluminum pan was placed in a vacuum oven at 190° C. and stripped for an additional 2 hours under vacuum. The resin appeared homogeneous and liquid like. The resin was cooled in the pan to a glassy solid, and broken into small pieces. The nanosilica solids content was measured on a TGA to be 24.54 wt. %.

Preparative Example 1:
4-(4-aminophenoxy)phthalonitrile (4APOPN)

234.0 g of 4-nitrophthalonitrile and 147.5 g of 4-aminophenol were added to a three neck 3 L round bottom flask. 1000 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 4-aminophenol. After all solids had dissolved in the DMSO, the nitrogen flow valve into the vessel was closed, and 233.5 g of potassium carbonate was added. After the addition, the nitrogen purge through the vessel was resumed. The DMSO solution was heated to 70° C. and maintained with stirring for 3 hours. The undissolved salts were separated from the DMSO solution by vacuum filtration through a Buchner funnel with filter paper (grade 4, available under the trade designation "WHATMAN Qualitative filter paper"). The filtered solution was added slowly to 1300 g of stirring cold methanol/water cooled to −20° C. by the careful addition of dry ice (60/40 by mass). A solid precipitated from solution. The solids were collected by vacuum filtration with a Buchner funnel on filter paper and washed with 500 g of cold methanol/water (60/40 by mass), 500 g of DI (deionized) water and 500 g of cold methanol/water (60/40 by mass). The solids were placed in an aluminum pan and dried in a convection oven set at 110° C. overnight. The total amount of solids collected was 265.6 g (83.5% yield). The solids had a melt temperature of 132° C. as measured by differential scanning calorimetry, and were identified as 4-(4-aminophenoxy)phthalonitrile by infrared and NMR analysis.

Preparative Example 2:
4-(3-aminophenoxy)phthalonitrile (3APOPN)

200.0 g of 4-nitrophthalonitrile and 126.06 g of 3-aminophenol were added to a three neck 3 L round bottom flask. 1000 g of DMSO was added. The flask was fitted with nitrogen gas purge line, a PTFE stir blade and stir rod, a condenser and a thermoprobe. The flask was purged with a continuous nitrogen gas flow. The DMSO solution was mechanically mixed to dissolve the 4-nitrophthalonitrile and 3-aminophenol. After all solids had dissolved in the DMSO, the nitrogen flow valve into the vessel was closed, and 199.57 g of potassium carbonate was added. After the addition, the nitrogen purge through the vessel was resumed. The DMSO solution was heated to 70° C. and maintained with stirring for 3 hours. The undissolved salts were separated from the DMSO solution by vacuum filtration through a Buchner funnel with filter paper (grade 4, available under the trade designation "WHATMAN Qualitative filter paper"). The filtered solution was added slowly to 1300 g of stirring cold methanol/water cooled to −20° C. by the addition of dry ice (60/40 by mass). A solid precipitated from solution. The solids were collected by vacuum filtration with a Buchner funnel on filter paper and washed with 500 g of cold methanol/water (60/40 by mass), 500 g of DI (deionized) water and 500 g of cold methanol/water (60/40 by mass). The solids were placed in an aluminum pan and dried in a convection oven set at 110° C. overnight. The total amount of solids collected was 251.5 g (92.5% yield). The solids had a melt temperature of 168° C. as measured by differential scanning calorimetry, and were identified as 4-(3-aminophenoxy)phthalonitrile by infrared and NMR analysis.

Examples 1-19 (Ex. 1-19)

All example material compositions were prepared according to the information presented in Table 1. Each example contains some amount of POM in the material composition (e.g., polymerizable compositions) delivered to the system by differing means (either in the PN resin blend or the curative) using the prescribed solvent. The PN resin blend in each example was prepared by heating the resin to 220° C. in an oven and melt blending the resin components. After melt blending, the resin blend was heated on a hot plate set to 150° C. and the curative was dissolved into the resin blend. After dissolution of the curative, milligram amounts were removed from PN resin system and cooled to ambient temperature for DSC analysis. The PN resin system was cured according to the prescribed cure schedule in Table 2. After cure, the polymerized network was cut into DMA test specimens. The networks were analyzed by IR by sanding the polymer with fine grit sand paper to produce a fine powder which was analyzed by ATR IR absorbance shown in Table 3. Tensile and compact tension specimens were cut from ⅛ inch (0.3175 cm) and ¼ inch (0.635 cm) thick cured polymer plaques produced from the resin composition presented for Example 10 and Example 14 results presented in Table 3.

Comparative Examples 1-8 (CE 1-8)

All comparative example material compositions were prepared according to the information presented in Table 1. Comparative examples do not contain curative in the resin system (CE 1) or do not contain POM in the resin system (CE 2-8). The PN resin blend in each example was prepared by heating the resin to 220° C. in an oven and melt blending the resin components. For each of Comparative Examples 2-8, after melt blending, the resin blend was heated on a hot plate set to 150° C. and the curative was dissolved into the resin blend. After dissolution of the curative, milligram amounts were removed from PN resin system and cooled to ambient for DSC analysis. The PN resin system was cured according to the prescribed cure schedule in Table 2. After cure, the polymerized network was cut into DMA test specimens. The networks were analyzed by IR by sanding the polymer with fine grit sandpaper to produce a fine powder which was analyzed by ATR IR absorbance shown in Table 3. Tensile and compact tension specimens were cut from ⅛ inch (0.3175 cm) and ¼ inch (0.635 cm) thick cured polymer plaques produced from the resin composition presented for comparative example results presented in Table 3.

TABLE 1

| Example | POM wt. % | BMPN wt. % | BTPN wt. % | RPN wt. % | Curative wt. % | Solvent |
|---|---|---|---|---|---|---|
| CE 1 | 15%; hydrated PTA, dispersed in PN resin blend | 85 | | | | MIBK |
| CE 2 | None | 57 | 28 | | 15%; 4APOPN | N/A |
| Ex. 1 | 13%; hydrated PTA, initially dispersed in PN resin blend | 73.1 | | | 13.9%; bisphenol FL | MIBK |
| Ex. 2 | 5%; dehydrated PTA, initially dispersed in curative | 54.1 | 26.7 | | 14.2%; 4APOPN | N/A |
| Ex. 3 | 5%; dehydrated PTA, initially dispersed in curative | 44.7 | 22.0 | | 11.8%; 4APOPN | MEK |
| Ex. 4 | 5%; dehydrated PTA, initially dispersed in curative | 54.1 | | 26.7 | 14.2%; 4APOPN | MEK |
| Ex. 5 | 5%; dehydrated PTA, initially dispersed in curative | 40.4 | 20.2 | 20.2 | 14.2%; 4APOPN | Acetone |
| Ex. 6 | 5%; dehydrated PTA, initially dispersed in curative | 80.8 | | | 14.2%; 4APOPN | Acetone |
| Ex. 7 | 5%; hydrated PTA, initially dispersed in PN resin blend | 80.8 | | | 14.2%; 4APOPN | MIBK |
| Ex. 8 | 1%; hydrated PTA, initially dispersed in PN resin blend | 84.2 | | | 14.8%; 4APOPN | MIBK |
| Ex. 9 | 17%; hydrated PTA, 15% initially dispersed in PN resin blend, and 2% initially dispersed in curative | 70.6 | | | 12.4%; 4APOPN | MIBK |
| Ex. 10 | 5%; dehydrated PTA, initially dispersed in curative | 60.6 | | 20.2 | 14.2%; 4APOPN | MEK |
| Ex. 11 | 5%; dehydrated STA, initially dispersed in curative | 60.6 | | 20.2 | 14.2%; 4APOPN | MEK |
| Ex. 12 | 2.1%; dehydrated MPA, initially dispersed in curative | 62.4 | | 20.8 | 14.8%; 4APOPN | MEK |
| Ex. 13 | 5%; dehydrated PTA, initially dispersed in curative | 60.6 | | 20.2 | 14.2%; 3APOPN | MEK |
| CE 3 | None | 63.8 | | 21.2 | 15%; 4APOPN | N/A |
| Ex. 14 | 5%; dehydrated PTA, initially dispersed in curative | 40.4 | 20.2 | 20.2 | 14.2%; 4APOPN | MEK |
| Ex. 15 | 5%; dehydrated PTA, initially dispersed in curative | 40.4 | 20.2 | 20.2 | 14.2%; 4APOPN | Ethyl Acetate |
| Ex. 16 | 5%; dehydrated PTA, initially dispersed in PN resin blend | 40.4 | 20.2 | 20.2 | 14.2%; 4APOPN | MIBK |

TABLE 1-continued

| Example | POM wt. % | BMPN wt. % | BTPN wt. % | RPN wt. % | Curative wt. % | Solvent |
|---|---|---|---|---|---|---|
| CE 4 | None | 42.5 | 21.25 | 21.25 | 15%; 4APOPN | N/A |
| Ex. 17 | 5%; dehydrated PTA, initially dispersed in PN resin blend | 90.1 | | | 4.9%; CAF | MIBK |
| CE 5 | None | 95 | | | 5%; CAF | N/A |
| Ex. 18 | 15%; hydrated PTA, initially dispersed in PN resin blend | 82.5 | | | 2.5%; APB | MIBK |
| CE 6 | None | 97 | | | 3%; APB | N/A |
| Ex. 19 | 14%; hydrated PTA, initially dispersed in PN resin blend | 78.7 | | | 7.3; biphenol | MIBK |
| CE 7 | None | 91.5 | | | 8.5%; biphenol | N/A |
| CE 8 | None | 84 | | | 16%; bisphenol FL | N/A |

N/A = not applicable

TABLE 2

| | Cure Procedure | | DSC (1° C./min ramp) | | | DMA (single cantilever, 3° C./min ramp) | | |
|---|---|---|---|---|---|---|---|---|
| Example | Initial cure | post cure | Cure initiation temp [° C.] | heat of reaction [J/g] | exothermic peak temperature [° C.] | E' (25° C.) [MPa] | Tg (E' onset) [° C.] | Tg (tan d peak) [° C.] |
| CE 1 | heated to 250° C. | | NO exothermic cure when heated to 250° C. | | | Incomplete cure | | |
| CE 2 | 205° C., 2 hrs | 6 hrs, 325° C.; 24 hrs, 300° C. | 169 | 185 | 180 | 2400 | 304 | 330 |
| Ex. 1 | 210° C., 2 hrs | 6 hrs, 325° C.; 24 hrs, 300° C. | 246 | 147 | 262 | 2845 | 267 | 300 |
| Ex. 2 | 210° C., 2 hrs | 3 hrs, 325° C.; 8 hrs, 300° C. | 220 | 211 | 223 | 2621 | 314 | 344 |
| Ex. 3 | 210° C., 2 hrs | 3 hrs, 325° C.; 8 hrs, 300° C. | 194 | 205 | 198 | 3176 | 317 | 346 |
| Ex. 4 | 210° C., 2 hrs | 3 hrs, 325° C.; 8 hrs, 300° C. | 214 | 216 | 217 | 2500 | 325 | 361 |
| Ex. 5 | 210° C., 2 hrs | 3 hrs, 325° C.; 8 hrs, 300° C. | 208 | 210 | 214 | 3000 | 323 | 357 |
| Ex. 6 | 210° C., 2 hrs | 2 hrs, 325° C.; 8 hrs, 300° C. | 232 | 211 | 234 | 2600 | 296 | 322 |
| Ex. 7 | 210° C., 2 hrs | 2 hrs, 325° C.; 8 hrs, 300° C. | 219 | 180 | 222 | 2400 | 267 | 286 |
| Ex. 8 | 210° C., 2 hrs | 2 hrs, 325° C.; 8 hrs, 300° C. | 213 | 179 | 216 | 2350 | 256 | 276 |
| Ex. 9 | 210° C., 2 hrs | 2 hrs, 325° C.; 8 hrs, 300° C. | 231 | 174 | 234 | 2900 | 284 | 316 |

TABLE 2-continued

| | Cure Procedure | | DSC (1° C./min ramp) | | | DMA (single cantilever, 3° C./min ramp) | | |
|---|---|---|---|---|---|---|---|---|
| Example | Initial cure | post cure | Cure initiation temp [° C.] | heat of reaction [J/g] | exothermic peak temperature [° C.] | E' (25° C.) [MPa] | Tg (E' onset) [° C.] | Tg (tan d peak) [° C.] |
| Ex. 10 | 210° C., 2 hrs | 3 hrs, 325° C.; 8 hrs, 300° C. | 214 | 237 | 217 | 2800 | 314 | 342 |
| Ex. 11 | 210° C., 2 hrs | 3 hrs, 325° C.; 8 hrs, 300° C. | 208 | 213 | 211 | 2800 | 321 | 356 |
| Ex. 12 | 210° C., 2 hrs | 3 hrs, 325° C.; 8 hrs, 300° C. | 208 | 213 | 211 | 2650 | 330 | 360 |
| Ex. 13 | 210° C., 2 hrs | 3 hrs, 325° C.; 8 hrs, 300° C. | 182 | 193 | 188 | 2500 | 309 | 343 |
| CE 3 | 205° C., 2 hrs | 6 hrs, 325° C.; 24 hrs, 300° C. | 188 | 180 | 192 | 2400 | 294 | 321 |
| Ex. 14 | 210° C., 2 hrs | 2 hrs, 325° C.; 8 hrs, 300° C. | 210 | 223 | 214 | 3100 | 334 | 371 |
| Ex. 15 | 210° C., 2 hrs | 2 hrs, 325° C.; 8 hrs, 300° C. | 202 | 169 | 205 | 2700 | 302 | 325 |
| Ex. 16 | 210° C., 2 hrs | 2 hrs, 325° C.; 8 hrs, 300° C. | 206 | 179 | 210 | 2700 | 301 | 326 |
| CE 4 | 205° C., 2 hrs | 6 hrs, 325° C.; 24 hrs, 300° C. | 173 | 165 | 175 | 2600 | 319 | 433 |
| Ex. 17 | 210° C., 2 hrs | 3 hrs, 325° C.; 8 hrs, 300° C. | 207 | 174 | 212 | 2670 | 250 | 267 |
| CE 5 | 210° C., 2 hrs | 6 hrs, 325° C.; 24 hrs, 300° C. | 178 | 177 | 183 | 3100 | 257 | 278 |
| Ex. 18 | 210° C., 2 hrs | 3 hrs, 325° C.; 8 hrs, 300° C. | 226 | 130 | 231 | 2750 | 241 | 260 |
| CE 6 | 210° C., 2 hrs | 6 hrs, 325° C.; 24 hrs, 300° C. | 187 | 112 | 192 | 2600 | 215 | 229 |
| Ex. 19 | 210° C., 2 hrs | 6 hrs, 325° C.; 24 hrs, 300° C. | 206 | 153 | 238 | 2800 | 260 | 297 |
| CE 7 | 210° C., 2 hrs | 6 hrs, 325° C.; 24 hrs, 300° C. | 246 | 143 | 264 | 2300 | 239 | 285 |
| CE 8 | 210° C., 2 hrs | 6 hrs, 325° C.; 24 hrs, 300° C. | 202 | 144 | 231 | 2570 | 257 | 291 |

TABLE 3

| Example | Triazine absorbance peak 1510 cm$^{-1}$ | Triazine absorbance peak 1355 cm$^{-1}$ | Phthalocyanine absorbance peak 1091 cm$^{-1}$ | Phthalocyanine absorbance peak 1011 cm$^{-1}$ | Tensile testing (ASTMD638) Stiffness [GPa] | Tensile testing (ASTMD638) Tensile Ultimate Strength [MPa] | Tensile testing (ASTMD638) Tensile Ultimate Strain [%] | Compact Tension Testing (ASTMD 5045) $K_{1C}$ [MPA · m$^{1/2}$] |
|---|---|---|---|---|---|---|---|---|
| Ex. 6 | 0.255 | 0.28 | 0.27 | 0.28 | — | — | — | — |
| Ex. 8 | 0.27 | 0.29 | 0.24 | 0.25 | — | — | — | — |
| Ex. 9 | 0.25 | 0.23 | 0.31 | 0.295 | — | — | — | — |
| Ex. 10 | 0.175 | 0.155 | 0.245 | 0.245 | 3.5 | 84 ± 8 | 3.8 ± 0.6 | — |
| Ex. 11 | 0.2 | 0.17 | 0.235 | 0.235 | — | — | — | — |
| Ex. 12 | 0.19 | 0.165 | 0.24 | 0.213 | — | — | — | — |
| Ex. 13 | 0.175 | 0.15 | 0.245 | 0.24 | — | — | — | — |
| CE 3 | 0.285 | 0.22 | 0.165 | 0.165 | — | — | — | — |
| Ex. 14 | 0.245 | 0.18 | 0.22 | 0.22 | 3.4 | 89 ± 6 | 3.8 ± 0.5 | 0.70 |
| Ex. 15 | 0.295 | 0.24 | 0.17 | 0.16 | — | — | — | — |
| Ex. 16 | 0.325 | 0.23 | 0.185 | 0.18 | — | — | — | — |
| CE 4 | 0.42 | 0.375 | 0.18 | 0.16 | 3.5 | 60 ± 14 | 2.2 ± 0.7 | 0.63 |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A polymerizable composition comprising:
   a) a phthalonitrile resin;
   b) a polyoxometalate of Formula I: $H_n[XM_{12}O_{40}]$ (I), wherein M is W or Mo, n is 1 to 6, and X is a heteroatom selected from P, Si, S, Ge, As, Te, or Se; and
   c) a curative.

2. The polymerizable composition of claim 1, wherein in Formula I, M is W.

3. The polymerizable composition of claim 1, wherein the polyoxometalate is $H_3[P(W_3O_{10})_4]$ or $H_4[Si(W_3O_{10})_4]$.

4. The polymerizable composition of claim 1, wherein in Formula I, M is Mo.

5. The polymerizable composition of claim 1, wherein the polyoxometalate is $H_3[P(Mo_3O_{10})_4]$.

6. The polymerizable composition of claim 1, wherein the phthalonitrile resin comprises at least one of bis(3,4-dicyanophenyl) ether of bisphenol M, bis(3,4-dicyanophenyl) ether of bisphenol T, or bis(3,4-dicyanophenyl) ether of resorcinol.

7. The polymerizable composition of claim 1, wherein the curative comprises an aniline functional phthalonitrile.

8. The polymerizable composition of claim 1, wherein the curative comprises a dianiline functionality.

9. The polymerizable composition of claim 1, wherein the curative comprises a phenol functionality.

10. The polymerizable composition of claim 1, wherein the curative comprises a phenol functional phthalonitrile.

11. The polymerizable composition of claim 1, further comprising at least one filler comprising at least one of reinforcing continuous fibers or reinforcing discontinuous fibers, a fabric, a nanofiller, or a microfiller.

12. An article comprising a polymerization product of the polymerizable composition of claim 1.

13. The article of claim 12, exhibiting a tensile ultimate strength of 75 megapascals (MPa) or greater.

14. The article of claim 12, exhibiting a tensile ultimate strain of 3% or greater.

15. A method of making an article, the method comprising:
   a) mixing a polyoxometalate with at least one of a curative or phthalonitrile resin,
      wherein the polyoxometalate is of Formula I: $H_n[XM_{12}O_{40}]$ (I),
      wherein M is W or Mo, n is 1 to 6, and X is a heteroatom selected from P, Si, S, Ge, As, Te, or Se;
   b) mixing at least a portion of the curative with at least a portion of the phthalonitrile, thereby forming a polymerizable composition comprising the phthalonitrile resin, the curative, and the polyoxometalate;
   c) subjecting the polymerizable composition to a temperature of 180° C. to 250° C., to form an at least partially polymerized article; and
   d) subjecting the at least partially polymerized article to a temperature of 300° C. to 350° C. to complete polymerization of the article.

16. The method of claim 15, wherein the polyoxometalate is obtained by dehydrating a polyoxometalate hydrate.

17. The method of claim 16, wherein the polyoxometalate is dehydrated during step a) by mixing the polyoxometalate hydrate with a solvent to form a polyoxometalate composition, mixing the phthalonitrile with a solvent at elevated temperature to form a phthalonitrile composition, combining the polyoxometalate composition with the phthalonitrile composition, and removing the solvent.

18. The method of claim 15, wherein the polyoxometalate is mixed with the curative by mixing the polyoxometalate with a solvent to form a polyoxometalate composition, mixing the curative with a solvent to form a curative composition, combining the polyoxometalate composition with the curative composition, and removing the solvent.

* * * * *